FIG. I

Aug. 26, 1969   F. E. SENFTLE ET AL   3,463,922
MINERAL ORE EXPLORATION APPARATUS
UTILIZING NEUTRON ACTIVATION
Filed July 29, 1966   5 Sheets-Sheet 2

INVENTORS
FRANK E. SENFTLE
ALFRED F. HOYTE
PRUDENCIO MARTINEZ, JR

BY Ernest S. Cohen
Gersten Sadowsky
ATTORNEYS

Aug. 26, 1969   F. E. SENFTLE ET AL   3,463,922
MINERAL ORE EXPLORATION APPARATUS
UTILIZING NEUTRON ACTIVATION
Filed July 29, 1966   5 Sheets-Sheet 5

INVENTORS
FRANK E. SENFTLE
ALFRED F. HOYTE
PRUDENCIO MARTINEZ, JR.

BY Ernest S. Cohen
Gersten Sadowsky
ATTORNEYS

United States Patent Office 3,463,922
Patented Aug. 26, 1969

3,463,922
MINERAL ORE EXPLORATION APPARATUS
UTILIZING NEUTRON ACTIVATION
Frank E. Senftle, Chevy Chase, Md., Alfred F. Hoyte,
Washington, D.C., and Prudencio Martinez, Jr.,
Accokeek, Md., assignors to the United States of
America as represented by the Secretary of the Interior
Filed July 29, 1966, Ser. No. 568,985
Int. Cl. G01t 1/16
U.S. Cl. 250—83.3                                3 Claims

ABSTRACT OF THE DISCLOSURE

Apparatus facilitating the analysis of the mineral ore content of a zone of substances in the ground. Adjustable mechanisms operable in the apparatus position a neutron generating source to irradiate the zone for a limited time, and thereafter release a detector to take a position over the zone to measure gamma rays emitted by the substances due to neutron absorption.

---

This invention relates to an apparatus employing neutron activation analysis in conducting explorations for mineral substances. For the purposes of the method, radioactivity is induced in the areas exployed to facilitate prospecting for the mineral substances in situ, and without disturbing the physical environment of such areas. More particularly, the operation of the invention involves a sequential application, during predetermined times, of a neturon source over an area of soil, rock or other matter in which mineral ores may be a constituent part, so as to irradiate the mineral ores in such substances, and of a gamma detector to obtain measurements of the radioactivity over the area emanating from irradiated substances which have become radioisotopes in the composite matter. Data furnished by these measurements indicating radioactivity characterized by specified energy levels and half-life periods, serves to identify mineral substances in the area as well as the relative amounts thereof.

An object of the present invention is therefore to provide an apparatus for mineral ore prospecting which is effectuated from outside the substances wherein ore may be found.

A further object of the invention is to provide a mineral ore exploration apparatus in which ore under a covering layer of material is made radioactive in situ so that detector analyzer apparatus located exteriorly of such layer of material becomes responsive to radiation emanating therefrom, and produces data from which the mineral contents of the ore can be determined.

These and other objects and advantages of the present invention will become more fully apparent from the following detailed description and from the accompanying drawing made a part hereof in which.

Figure 1:
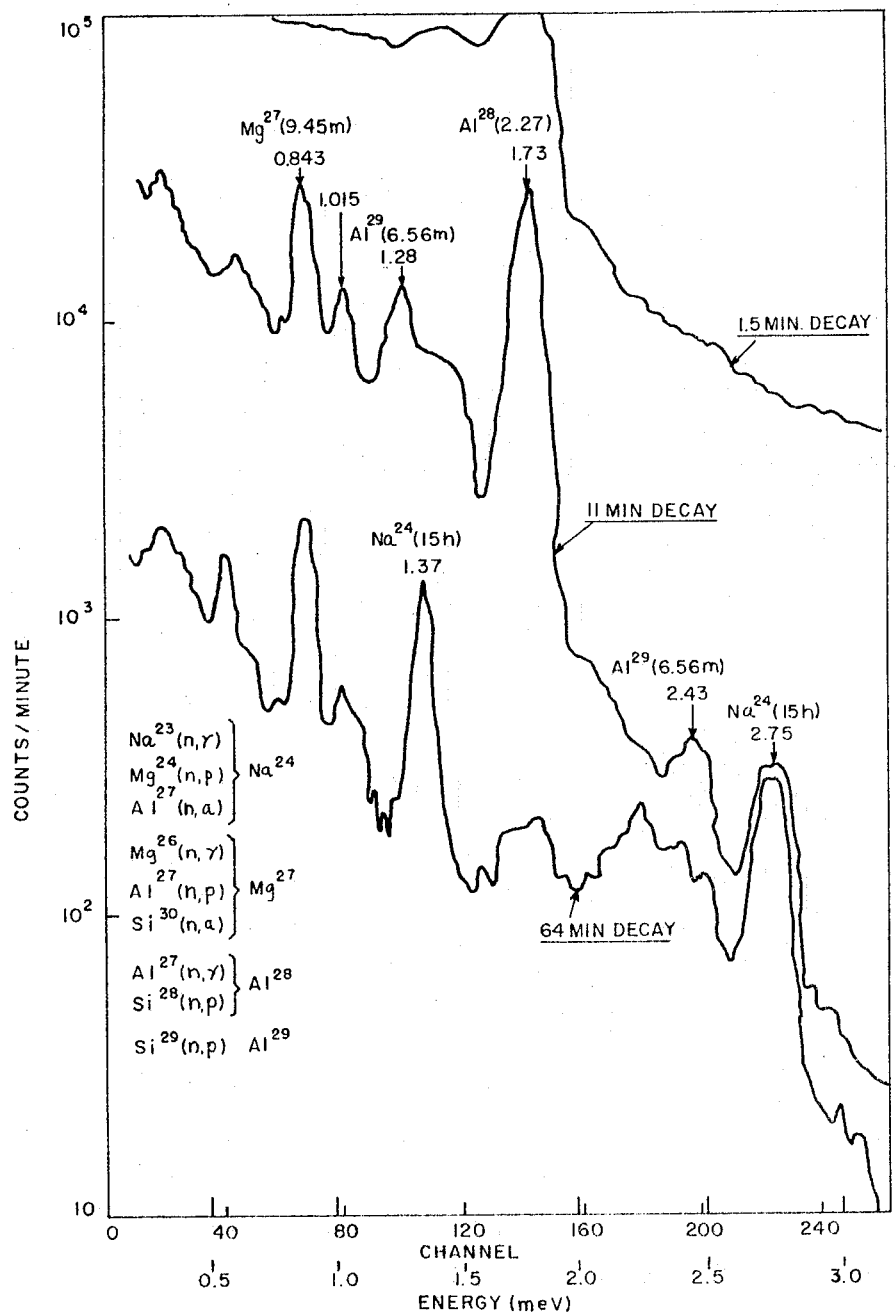
FIG. 1 shows gamma spectra of a soil sample after irradiation with a high energy neutron generator.

The radioactive properties of substances have heretofore been described as having utility in connection with geophysical prospecting. Herzog's Patent No. 2,678,398, issued May 11, 1954, for one, discloses proespecting for minerals wherein use is made of several different arrangements of radiation detectors which respond to gamma ray emissions occurring naturally at different points under ground or rock cover. As explained in this patent, mineral ore deposits, including those of non-radioactive metals, are located indirectly by an analysis of significant deviations in gamma ray intensities from the ground and rock containing such ore deposits. Thus, these ore deposits are described as having faintly radioactive auras which, if properly detected, act as markers for the ore deposits, whether or not the deposits themselves are radioactive. Evident drawbacks of Herzog's teaching are the great amount of time required to secure any significant measurement of naturally occurring gamma ray activity, and the uncertainties inherent in the indirect manner in which the ore bodies are identified. In contradistinction to this teaching the present invention directs that mineral substances be irradiated in situ by a neutron source such that the minerals themselves become strongly radioactive for a relatively short time whereby significant measurements of the radioactivity can be readily taken, and identification of the minerals rapidly made.

Irradiation of ground cover by neutron sources has also heretofore been usefully applied in connection with determining soil density and the presence of hydrogenous matter in a soil or a surface layer thereof. Exemplary teachings of such applications are found in Belcher et al., Patent No. 2,781,453, granted Feb. 12, 1957, and in Kirkham et al., Patent No. 2,999,160, granted Sept. 5, 1961. However, such patents are concerned with determining the density or physical characteristics of the soil, and the moisture content thereof, and not with mineral detection as in the present invention. Further, the patents specify the use of a fast neutron source to irradiate hydrogen in the soil including that found in the soil moisture and hydrocarbonaceous matter. As explained in these patents, the fast neutrons are scattered and slowed down more strongly by hydrogenous substances than by substances containing only heavy atoms. The radioactivity resulting from the fast neutron irradiation, on which Belcher et al. bases a determination of the soil layer density, consitutes only a secondary effect under the circumstances. On the other hand, the present invention neither depends on natural radioactivity as in Herzog, or on a fast neutron source as in the other two patents noted, but can also utilize a source of slow or thermal neutrons or a moderated fast neutron source to effect irradiation of mineral ores embedded in a zone of matter. As a result, appropriately strong and definitive gamma ray emission is obtained from such ores. Detection of the gamma rays and subsequent processing thereof in pulse height and half-life analyses can therefore be expediently accomplished to make available the data identifying the mineral substances present in the zone.

Studies made to determine the behavior of neutrons beamed at substances which constitute ordinary overburden of mineral deposits, such as soil and rock, have brought to light the several phenomena, hereinafter more fully explained, upon which rest the more basic considerations of the present invention. The character of a neutron flux induced in such substances, that is the number of neutrons crossing a unit area of a hypothetical surface of a substance in either direction, is dependent for a given energy range and at a given depth not only on the moderation of the neutrons by the soil above a layer of soil at a predetermined depth, but also on the neutrons scattered or reflected from the soil at greater depths. It was found that the flux constituted by neutrons having incident energies within a predetermined range and initiated by a predetermined incident or source energy is substantially higher in soil layers below the directly irradiated cover or surface layer of soil because of the scattering present at greater depths due to the neutrons that are reflected upward from deeper layers and across the hypothetical surface at the particular depth in the soil. For example, neutron flux having an incident energy in the range of 10 ev. to 1 kev., initiated by energies of 3 mev. or 14 mev., produced a flux in a soil layer 2 to 3 feet thick which was almost an order of magnitude higher than that produced in just the absorbing layer or slab above the aforesaid thicker layer.

A further phenomenon indicated is that in respect to fluxes such as would be necessary for a practical activation of mineral substances in situ, a flux of low incident neutron energies produced from a lower initiating incident neutron energy, i.e., 3 mev. as compared to 14 mev., extends over a wider range of depths and is deeper than the same flux of a similar incident neutrons produced from the higher initiating incident neutron energy. Although the flux from the higher energy source can provide neutrons having a deeper penetration the density of these neutrons in a low energy flux range is necessarily lower because of the higher initial energy at the source. It was found that the unscattered fast neutron flux decreases almost exponentially with depth such that most of the possibly useful fast neutron reactions takes place in the upper layers of soil.

Evident from the above considerations is the importance of determining the incident neutron energy at a source which will yield the highest low to thermal energy extending over the widest range of depth and extending to the greatest depth below the surface. Working with incident energies of 1, 2, 3, 5, and 14 mev. to obtain a useful flux having incident neutron energies within the range of 1 kev. to 10 ev., a maximum total flux was produced between incident energies of 1 and 2 mev. Thus, moderation of the neutrons produced from higher incident neutron energy sources or generators is desirable to achieve the highest total flux of low to thermal energy neutrons below the surface. In soil and rock containing moisture to any degree, greater scattering is to be expected from the increased hydrogen concentration. However, the increase scattering in moist soil will result in a larger number of neutrons being reflected from the soil near the surface into the air where most of such neutrons will be lost. Although the flux of low energy neutrons below the surface at any given depth will be augmented to some extent by the neutrons reflected from deeper levels, this enhancement does not offset the loss of neutrons at the surface. Accordingly, it becomes evident that the hydrogen content of the ground substances is a negative factor in securing the beneficial results that can be derived from the detecting method of the present invention, namely, identifying and analyzing mineral ores in situ. Also thus made evident is that the moisture detecting and measuring inventions of the previously identified patents to Belcher et al. and Kirkham et al., whose usefulness is dependent upon the effectiveness of the interaction between the hydrogen in the moisture and the neutrons beamed thereat, teaches away from the concept underlying the present invention.

Many of the thresholds for fast reactions are above 3 mev., and hence a 14 mev. neutron source may become necessary for mineral exploration based on fast neutron reactions. For equal flux output, the 3 mev. source has the advantage of the higher slow to thermal neutron flux to the greatest depth, as indicated above. Nevertheless, the output of a 14 mev. source being several orders of magnitude higher, has a higher initial flux acting to increase the lower energy flux at any specified depth, which in some instances would favor it for mineral exploration based on thermal neutron capture processes.

In connection with selecting an available neutron flux which is high enough to induce radioactivities in specific elements for practical detection, consideration is given to the desirability of employing the higher fluxes provided by the fast neutrons of a high energy source. The activation cross-sections for fast neutron interactions are generally much lower than slow or thermal neutron activation cross-sections and thus the induced radioactivity will be correspondingly lower. However, the fact that a flux of 10 to 100 times more fast neutrons can be obtained in a given time as compared with the thermal neutron flux from, for example, a 14 mev. neutron source may compensate at least in part for the loss in sensitivity due to the generally lower cross-sections of the fast neutrons produced. While the radioactivities induced in nuclides by the fast neutrons are generally considered somewhat lower than that effectuated by slow or thermal neutrons, they are nevertheless substantial in many cases. Thus, although the sensitivity of an exploration method based on a fast neutron technique may be lower compared to a thermal technique for some elements, it may be more specific for a given element and hence can be more useful for a particular problem.

Of special interest herein are the consequences of utilizing fast neutrons in prospecting in situ. Fast neutron irradiation is notably effective to produce radiation from such elements as aluminum, oxygen, silicon, sodium, and phosphorus which constitute the usual constituents of gangue and soil with which economically interesting minerals are associated as ores in situ. Silicon, because of its preponderance in many rocks and soils, can be a serious source of background activity. It is therefore obvious that by reason of the fact neutrons of irradiation, such as induced by 14 mev., considerable background activity from gangue and soil constituents could be encountered. Generally, the fast neutron spectrum of a typical soil immediately after irradiation will have two major peaks, one between 6 and 7 mev. due to the 7.3 sec. $^{16}$N produced by a (n, p) reaction on $^{16}$O, and a second peak at 1.73 mev. due to 2.3 $^{28}$Al produced either by an (n, p) reaction on $^{27}$Al or by an (n, p) reaction on $^{28}$Si, as indicated in the graphical study illustrated in FIG. 1. Because of its relatively short half-life (2.3 min.), $^{28}$Al decays to a low activity in about 11 minutes at which time several other emitters can be identified which are formed from the Al, Si, Mg and Na in the soil. It is clear from the above that the fast neutrons of a 14 mev. neutron source is not desirable if identification data on particular valuable minerals is sought. Even though the 14 mev. neutron source will yield a larger thermal flux at a greater depth in the ground, in most cases the background due to the fast neutron reactions from the common gangue elements such as oxygen and silicon will be intolerable. With the exception of aluminum, the elements in common gangue minerals are not easily activated by thermal neutron irradiation. However, after a two minute thermal neutron irradiation, and a five second delay, $^{27}$Al having a major gamma radiation energy of 1.78 mev., can be distinguished from such minerals as silver, which after a two minute thermal neutron irradiation and a five second delay, has its $^{110}$Ag and $^{108}$Ag indicating a major gamma radiation energy of 0.66 mev., and 0.44 mev., respectively.

The identification of mineral ores in situ must of course rely upon a selective activation and selective detection, as far as possible, for a particular radioisotope. To achieve maximum selectivity for a given isotope consideration is given to a number of controlling parameters. Importantly involved is a saturation activity factor $A_s$, based on a product of such parameters including the activation cross section ($\sigma$), the neutron flux ($f$ in neutrons per unit area), the total number of atoms of the element in the target (N), and the relative abundance of the isotope from which the radioisotope is formed ($k$). Saturation activity factors correspond to the activity obtainable from a source for irradiation periods which are long compared to the half-life of the radioisotope to be formed. Such factors for various isotopes are given in tables prepared by F. E. Senftle and W. R. Champion, and published in the supplement of Nuovo Cimento 12 (1954), page 549, for fixed weight and flux values. The saturation activity can therefore be used to readily calculate the activities produced for any flux, irradiation, or decay time, by means of the following relationship defining neutron activity $A_t$ in disintegrations per second of the radioisotope in a sample, after the isotope is separated from the flux for a period of $\theta$ seconds:

$$A_t = (\sigma f N k)(1 - \exp\left[-\frac{0.693t}{T}\right]) \exp\left[-\frac{0.693\theta}{T}\right]$$
$$= A_s(1 - \exp[-\lambda t]) \exp[-\lambda \theta]$$

where $t$ = time of irradiation
$T$ = half-life of radioisotope formed
$\theta$ = time of decay
$\gamma$ = decay constant To minimize the effect of interfering elements, both the irradiation time $t$ and the delay time, or period between the end of irradiation and the start of detection for measuring radioactivity, can be controlled. From the above equation it is seen that the differences in activity $A_t$ of two isotopes after an irradiation time $t$ depends on, the half life $T$ and the saturation activity $A_s$. The decay time $\theta$, needed to further enhance the resultant activities will also depend on $T$ and $A_s$. The irradiation and decay times which will yield the optimum activity for a given isotope depends on the ratio of the saturation activities and decay times, and whether or not it is advantageous to enhance the long or short lived activity of the two isotopes in question. Thus, by letting 1 and 2 indicate the short-lived and the long-lived activity, respectively, it is possible to obtain maximum activities for either of two interfering isotopes by the following procedure.

In respect to short-lived radioactivity wherein the relationship $$\left(\frac{A_{s2}}{A_{s1}}\right) < \left(\frac{\lambda_1}{\lambda_2}\right)$$

appears, consideration is given to the relationship for decay time $$t_{max} = \frac{\{\log(\lambda_1 A_s) - \log(\lambda_2 A_s)\}}{(\lambda_1 - \lambda_2)}$$

where $\lambda = 0.693/T$; to deduce the irradiation time which will produce the highest relative radioactivity in the short-lived isotope. As the short-lived radioactivity is higher than the longer lived activity, a delay time before counting will not produce further enhancement. Therefore, counting should start immediately after irradiation. If it appears that $$\left(\frac{A_{s2}}{A_{s1}}\right) > \left(\frac{\lambda_1}{\lambda_2}\right)$$

the radioactivity of the long-lived isotope will be greater than the short-lived isotope for all values of $t$. In that event the best that can be done is to use as short an irradiation time as possible.

In respect to long-lived radioactivity wherein the relationship $$\left(\frac{A_{s2}}{A_{s1}}\right) < \left(\frac{\lambda_1}{\lambda_2}\right)$$

appears, the irradiation time should be long enough to saturate the long-lived isotope and allow the short-lived isotope to decay before counting. It can be shown that the decay time which will produce the highest relative radioactivity in the long-lived isotope is given by:

$$\theta = \frac{\{\log(\lambda_1 A_{s1}) - \log(\lambda_2 A_2)\}}{\lambda_1 - \lambda_2}$$

If it appears that $$\left(\frac{A_{s2}}{A_{s1}}\right) > \left(\frac{\lambda_1}{\lambda_2}\right)$$

irradiation should be long enough to reach saturation activity in the long-lived isotope. A finding for decay time $\theta$ in this instance would not aid in calculating a delay time as the long-lived activity never reaches a maximum value relative to the short-lived activity. Only after the short-lived activity decays to a neglible value, i.e., six times the half-life of the radionuclide produced, does it become possible to determine data corresponding to the long-lived radioactivity.

The above procedures for enhancing a given activity are based on a one to one ratio of the parent element in the sample. In practice the $A_s$ ratios have to be adjusted to the actual concentration of the elements in the rock or soil. Although these techniques cannot be used to eliminate completely the effects of interfering elements they can be used in an exploration method where maximum sensitivity is desired for a specific isotope.

In disclosing a practical application of the present invention reference is made herein to the details of a procedure for detecting silver in situ. Since silver is easily made radioactive by exposure to slow neutrons, a neutron activation method is very practical and effective for locating silver deposits. Simply described, the procedure constitutes a unique exploration technique in which silver is made radioactive in situ and its efflux of gamma rays detected with a gamma radiation counter whose output is analyzed and interpreted. More specifically, the invention contemplates the use of a mobile rig whereon a neutron generator and a radiation counter are arranged to be selectively positioned in operative relationship to the covering substances of an area under investigation. As will be hereinafter more fully explained, the generator and counter are subject to adjustments and control necessitated by the requirements of the procedure in accordance with the present invention.

Analyzer equipment suitably mounted for use in a compartment on the rig or in a trailer some distance away from the generator target, as dictated by the intensity of the neutron generator flux employed, is operatively associated with the generator-counter arrangement. Such equipment comprises a multichannel analyzer of the type which is identified as RIDL-34 in an article entitled "Use of Very-Short Lived Isotopes in Activation Analysis," by O. U. Anders, in Analytical Chemistry, volume 33, No. 12 (1961), on pages 1706 to 1709. This particular analyzer has a 200 channel memory, which may be subgrouped into 1 x 200, 2 x 100, or 4 x 50 channels, and a subgrouping selector switch. Gamma spectrum data is collected in the channels of the memory in accordance with the energy levels of the gamma rays detected whereby the count rates of rays of corresponding levels are grouped in assigned channels arranged in order of the potentials of the energy levels. Repeated scannings of the detector-counter for count rate signals at sequential predetermined energy levels, provide read-in to the channels. Each scan adds to the content of the separate channels containing the cumulative spectra from the previous runs. The cumulative counts are thereafter read-out into another part of the memory and at the end of a predetermined number of cycles the contents of the memory is printed out, punched on paper tape for use in a computer, or supplied to a recorder which is operable to produce graphical representations such as the spectra shown in FIG. 1, relating energy levels of the radiation to cumulative count rates.

Elemental silver consists of two isotopes $Ag^{107}$ and $Ag^{109}$, having naturally occurring isotopic abundances of 51.4 and 48.6 percent, respectively. For short periods of irradiation of silver by thermal neutrons, the long-lived 250 day isotope $Ag^{110m}$ is not produced in significant quantities. However, significant quantities of 2.3 minute Ag¹⁰⁸ and 24.5 second Ag¹¹⁰ are formed by the following reactions showing the energy of the delayed gamma emission.

$$Ag^{107}+n \rightarrow Ag^{108} \ (2.3 \ min.)+\gamma \ (0.44 \ mev.) \cdot B^- \cdot B^+$$
$$Ag^{109}+n \rightarrow Ag^{110} \ (2.45 \ sec.)+\gamma \ (0.66 \ mev.)$$

Because of the large capture cross-section (110 barns) of $Ag^{109}$, and short half-life of $Ag^{110}$ (24.5 sec.), the 0.66-mev. gamma ray is the most prominent emission from silver for neutron activation periods of about a minute's duration. There is a weak 0.63 mev. gamma emission from $Ag^{108}$ but this will make only a minor contribution to the total activity. The 0.44-mev. gamma ray from $Ag^{108}$ will also be present, but will be one or two orders of magnitude lower in intensity. If the neutron irradiation time is limited to about 100 sec., the $Ag^{110}$ activity will essentially reach saturation and can be used to detect the presence of silver. In a neutron flux of $10^8$ neutrons/cm.²/sec., the induced 0.66-mev. activity in one gram of silver will be about $2 \times 10^7$ disintegrations/sec. This is about 1000 times the measurable gamma activity of one gram of uranium in equilibrium with all of its decay products, and hence there is ample activity for detection. Under the same conditions of activation, most of the other elements do not reach this relatively high disintegration rate. Although this is in favor of the proposed technique, other problems must be considered.

For the previously mentioned mobile operation, it is desirable to obtain the largest neutron flux to weight ratio. Hence use is made of a small 150-kev. accelerator-type neutron source rather than an isotopic source such as an Am-Be neutron source. By use of a remote control system, an accelerator-type neutron source can be safely used without the massive shield required for an isotopic source. Moreover, an accelerator-type source is more versatile in that it allows use of a flux of either 14-mev. or 3-mev. neutrons depending on whether a tritium or a deuterium target is used. With a 14-mev. generator, there can be obtained a flux of $10^9$ n/cm.²/sec., and with a 3-mev. generator, the flux is generally two orders of magnitude less. Although silver will become activated in a flux of either energy, detection may be much simpler in one case than in the other.

Since the probability of a silver atom becoming activated is relatively small for high energy neutrons such as provided by a 14-mev. source using the reaction $H^3(d, n)He^4$, the neutron energies made available thereby must be reduced or moderated by allowing the neutrons to pass through some hydrogenous material. The process of moderation is a statistical one, and a large fraction of the neutron flux will have relatively high energy, even after passing through the moderator. Thus, besides the usual low energy or thermal $(n, \gamma)$ reactions, it would be reasonable to expect that fast neutron reactions of the type $(n, 2n)$, $(n, p)$, and $(n, \alpha)$ reactions which may produce interfering activities that tend to mask the silver activity. However, when corrected for the concentrations that might be found in a typical rock, the activities of the more important interfering elements in the energy range of 0.55 mev. to 0.77 mev., which includes the 0.66 mev. energy of $Ag^{110}$, are for the most part quite low. The highest activity is due to the $K^{41}(n, \alpha)Cl^{38}$ reaction. As the half-life of $Cl^{38}$ is one second, this activity is gone in about 5 seconds and the activity of the 37 min. isotope of $Cl^{38}$ is not significant in this case. In practice a delay time of about 5 seconds between the neutron irradiation and the start of the counting period is necessary in order to place the detector in position, and so this activity can be neglected. Assuming the flux of thermal and fast neutrons are about the same, the only other significant activities will be due to the parent nuclides $Ti^{50}$ and $Ba^{136}$ [by an $(n, \gamma)$ reaction], to $Zr^{90}$, $Mo^{92}$, $Ba^{138}$, and $Pb^{208}$ [by an $(n, 2n)$ reaction], and to $V^{51}$ [by an $(n, p)$ reaction]. The total activity from the fast neutron-produced radioisotopes is about 66 disintegrations/sec./gram of rock.

In practice, however, it is not feasible to use a 14-mev. neutron source with a flux such as $10^9$ n/cm.²/sec. at the target to deliver $10^8$ n/cm.²/sec. to the irradiated sample area in the ground. If we assume that a minimum of 10 cm. of moderating material, such as paraffin or polyethylene, is used between the accelerator target and the surface of the ground, the flux will be reduced by two orders of magnitude due to inverse square considerations, i.e., about $10^7$ n/cm.²/sec. The thermal neutron flux will be about half of the fast neutron flux, so that it is possible to obtain an effective thermal flux of about $5 \times 10^6$ n/cm.²/sec. Thus the background due to fast neutron produced activities will be $5 \times 10^6/10^8 \times 66$ or 3.3 disintegrations per sec. per gram of rock. Under these conditions, silver yields $1.5 \times 10^6$ disintegrations per second per gram. Assuming a practical minimum detection activity of twice background (i.e., 6.6 d/sec./g. of rock), it should be possible to detect $4 \times 10^{-6}$ gram of silver in a gram of typical rock, or a silver concentration of about 0.1 oz. per ton.

In an alternative technique use is made of an accelerator with a deuterium target which yields 3-mev. neutrons by the reaction $H^2(d, n)He^3$. In this case a typical neutron flux at the target is about $5 \times 10^7$ n/cm.²/sec. However, the target may be lowered close to the surface, as little or no moderator is needed. For neutrons with this initial energy, the ground supplies sufficient moderation for practical purposes to reduce the energy of the neutrons. Thus the thermal flux in the irradiated area will be a little lower but comparable (i.e., $\approx 10^6$ n/cm.²/sec.) to the situation where 14-mev. neutrons were used. However, in this case there are no high energy neutrons, and the background activity due to $(n, \alpha)$, $(n, p)$, and $(n, 2n)$ reactions will be nil. For silver prospecting this is an important consideration because of the large number of interfering activities from fast-neutron reactions. With 3-mev. neutrons, the background would be very low, and the sensitivity should be enhanced compared to the case where 14-mev. neutrons are used.

As the neutron activation method allows examination of a sample in situ, the total sample observed will be a few hundred pounds. If the background from such a large sample can be essentially eliminated by electronic subtraction of the background taken after the short-lived silver peak has decayed and by use of 3-mev. neutrons, an enhancement of sensitivity to 0.05 oz. per ton is possible. However, the large sample implies appreciable scattering of the gamma rays by interaction with electrons of the atoms in the sample and a consequent muddling of the spectrum of gamma rays detected. This spectrum degradation and the diversity of extraneous nuclides formed may prevent the practical achievement of such a high sensitivity. If a sensitivity of 0.1 oz. per ton can be achieved, the method can still be an eminently practical exploration method.

Figure 2:
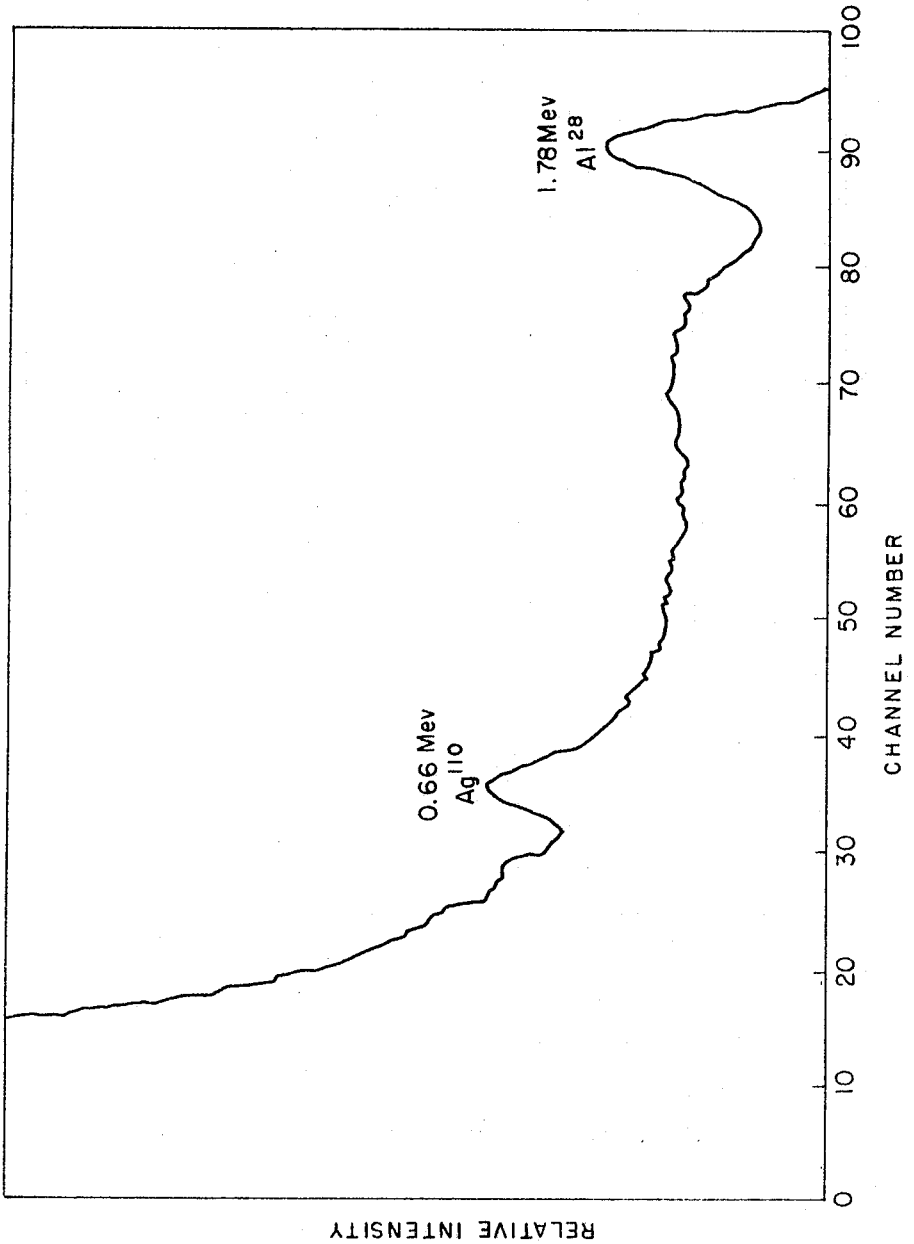
FIG. 2 shows a spectrum of simulated silver ore after irradiation with a moderated high energy neutron source.
Figure 3:
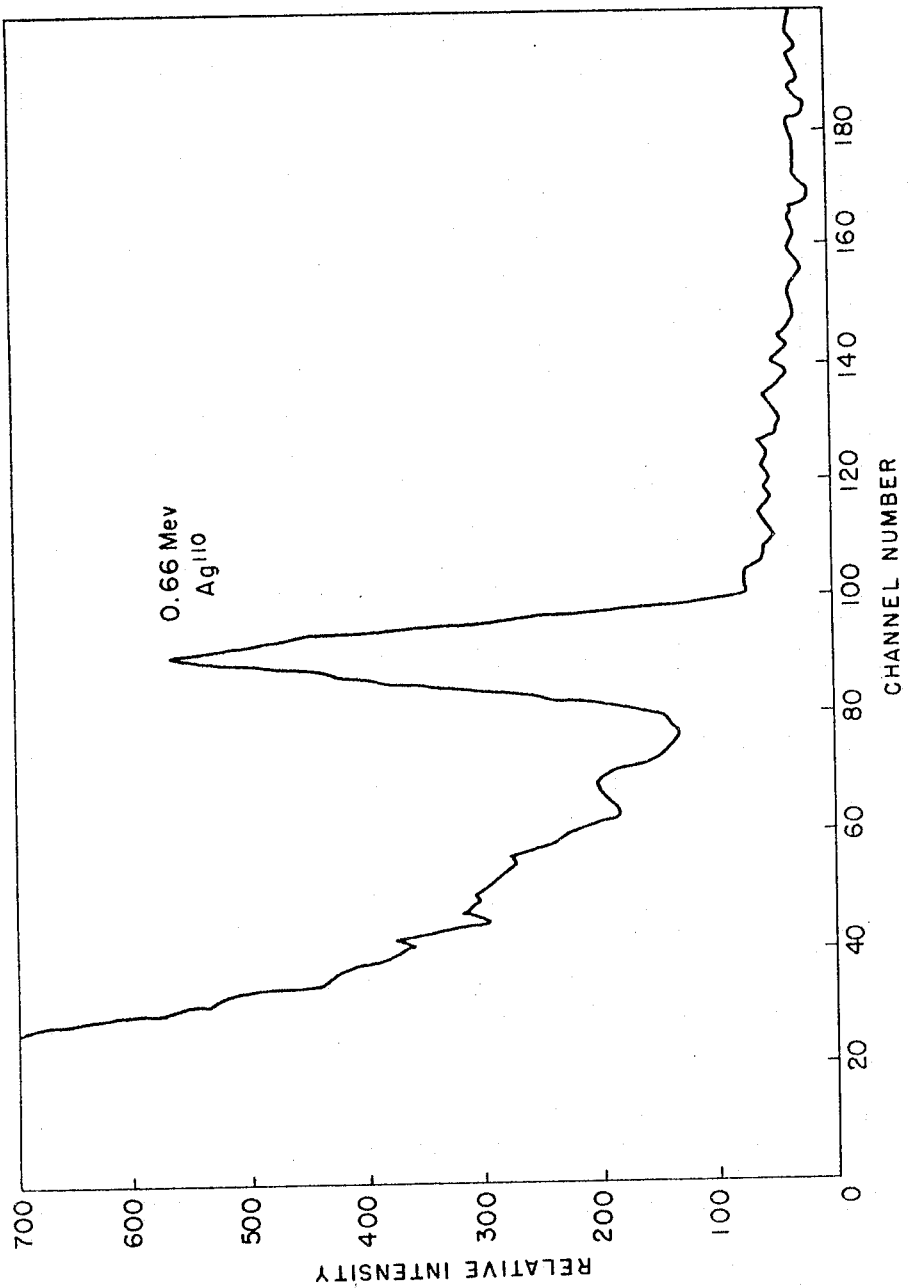
FIG. 3 shows a spectrum of simulated silver ore after irradiation with a moderated lower energy neutron source.

FIG. 2 shows a typical spectrum taken with 14-mev. neutron irradiation and 6 inches of paraffin moderator over ground "salted" with about 40–50 grams of silver in connection with simulated field tests. A volume containing an estimated 300 lbs. of rock was exposed to the neutron field. This represents a sample equivalent to about 10 oz. of silver per ton of ore. The background activity, due to fast neutron induced activities in the rock and associated Compton scattering is quite high. In particular the $Al^{28}$ peak produced by fast neutrons interacting primarily with silver is very high. For approximately the same amount of silver, under similar conditions but using 3-mev. neutrons and a half-inch of paraffin moderator, the spectrum in FIG. 3 was obtained. The background due to fast neutron induced activities is gone, and the signal to noise ratio is considerably greater.

Figure 4:
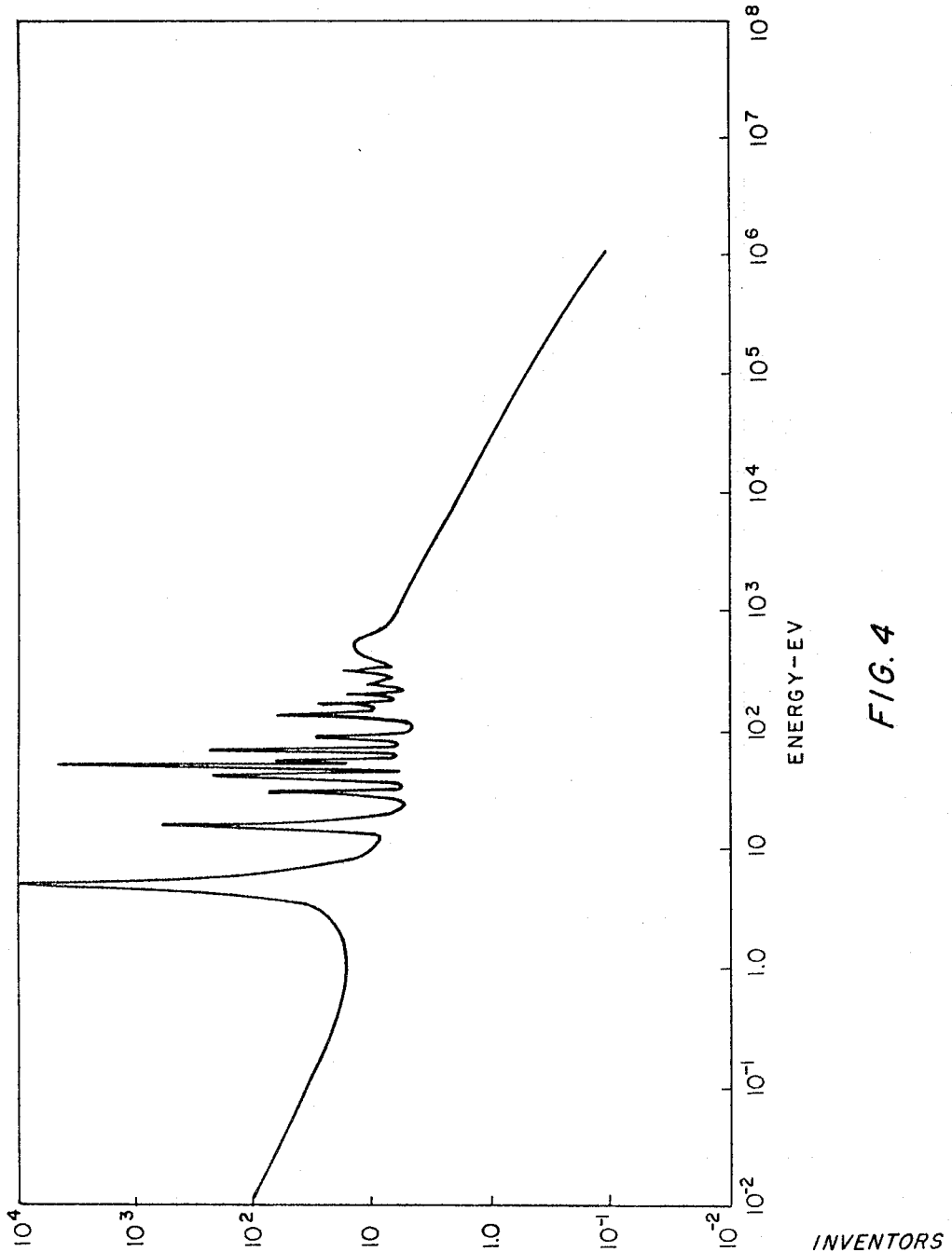
FIG. 4 is a graphical illustration of the relationship between energy of incident neutrons and probability of activation of silver.

A smoothed-out curve of the variation of the total cross-section of silver or probability of a silver atom becoming activated is plotted as a function of neutron energy in FIG. 4. While the cross-section is high for thermal neutrons (0.025 ev.), the presence of the high resonance peaks indicates that most of those neutrons with energies less than 1 kev. will also be important for activation. To obtain the maximum silver activation, it is desirable (1) to reduce the energy of the neutron flux so that as many of the neutrons as possible have energies of less than 1 kev., and (2) to have a maximum flux of moderated neutrons to as great a depth as possible. As was previously explained, to accomplish this ideally it is necessary to irradiate the ground with neutrons which have an initial energy of between 1.5 and 2.0 mev., i.e., the soil or rock is used to moderate the initially high energy neutrons. If a deuterium target is used in the accelerator to produce neutrons of about 3 mev., it was found that the maximum activation exists if about 1.6 cm. of paraffin is used in front of the target as a moderator. A thickness of up to 12 inches of paraffin is also used around the sides of the target to scatter as many neutrons as possible toward the ground. With this arrangement the target of the accelerator can be placed about 2 cm. from the surface of the ground. When a tritium target is used, considerably more paraffin (15 cm.) is necessary to maximize the silver activity produced by the 14-mev. neutrons, and the target is necessarily about 16 cm. from the ground. Under these conditions, the fast-neutron flux is decreased by a factor of more than $2 \times 10^2$ by its divergence along, as previously described.

Due to scattering of neutrons in the upward direction from deep layers of soil, the slow-neutron flux (10 ev. to 1 kev.) exists down to about 19–20 inches below the surface. Projection of these data to neutrons in the thermal region and somewhat above where the cross-section is moderately high suggests that a significant flux of neutrons with useful energies probably exists to depths as great as 30 inches below the surface.

The depth of penetration of the silver detector will depend not only on the neutron penetration, but also on the attenuation of the 0.66-mev. gamma radiation from the induced $Ag^{110}$. As discussed above, the sensitivity of the neutron activation technique for silver is more than adequate for those concentrations generally considered as ore grade material, and hence, while the absorption of the gamma emission is severe, the method can be useful in detecting silver at considerable depth. For instance, a 100-pound sample running 10 oz./ton of silver will have an activity of about $4.5 \times 10^6$ disintegrations per second if irradiated with $10^6$ neutrons/cm.$^2$/sec. for about 100 sec. Assuming a 10 percent counting efficiency and a minimum positive detection level of 100 counts per second above background, an attenuation factor of $2 \times 10^{-4}$ is obtained.

Figures 5, 6:
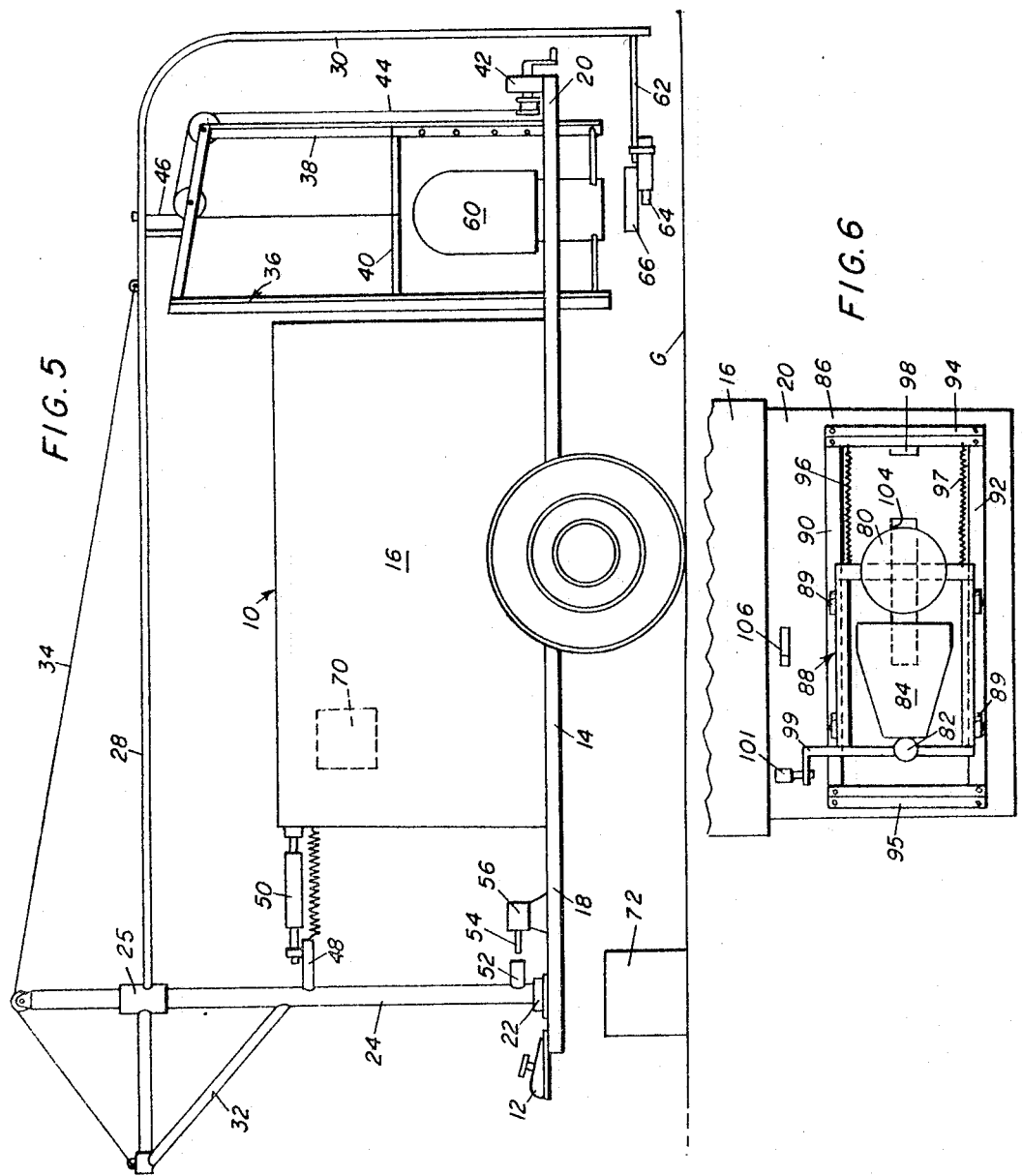
FIG. 5 shows an apparatus having utility in the practice of the mineral ore prospecting method of the present invention.
FIG. 6 shows a further embodiment of an apparatus by means of which the invention may be practiced.

One form of an apparatus having utility in connection with carrying out the method of the present invention is represented in FIG. 5 as comprising a two-wheel trailer 10 adapted to be drawn at a coupling or hitch 12 by a suitably rugged four-wheel drive vehicle. A base 14 of trailer 10 supports an enclosed compartment 16, and provides rack-like platforms 18 and 20 at the front and rear of the compartment, respectively. The enclosed part of the trailer normally houses a motor-generator set, cable reels, tools and the like. An upwardly disposed socket 22 bolted at its flange to the forward end of platform 18, supports for rotation therein the lower end of an upright pole 24. A collar 25 secured to pole 24 near the upper end thereof supports a generally horizontal boom structure 28 having at its far end an integral portion 30 disposed vertically to extend below base 14 of the trailer. A strut 32, fixed to pole 24 and the other end of boom 28, and a guy wire 34 extending over the top of pole 24 and secured to the boom at separated points thereon, steady boom 28 during displacements thereof in an operation to be hereinafter more fully explained.

An upright frame 36 fixed to platform 20, comprises a pair of tracks 38 in which an elevator structure 40 is supported for vertical displacements. Disposition of the elevator structure 40 is controlled by a cranked reel device 42, which acts on a cable 44 supported on pulleys appropriately arranged on frame 36, and fixed to an upper segment of the elevator structure. A notched stop 46 is fixed to the top of frame 36 to further support boom 28 when it is brought to operative position. An arm 48 extending radially out of pole 24 near its center has connected thereto a spring and damper assembly 50 which is further joined to an upper part of an end wall of enclosure 16. An additional radial extension 52 near the lower end of pole 24 is provided with an opening in which can be received a plunger 54 of a solenoid 56.

A neutron generator 60, shown secured in the base of elevator 40, is disposed to aim its target at the ground G. Generator 60 can be a 150 kev., positive ion accelerator type source using a sealed drift tube. Drift tubes with tritium or deuterium targets are easily interchangeable to provide either 14 mev. or 3 mev. neutrons. Attached to an arm 62 extending from the far end of extension 30, is a detector 64 over which is secured a lead shield 66. A relatively large block of paraffin 72, which can be made about a foot thick, is placed on ground G to further protect detector 64 during neutron irradiation as is hereinafter explained. The showing in FIG. 5 also includes an electrical junction and control box 70 having electrical connections to solenoid 56, as well as the generator and detector equipment. Control and power cables connect control box 70 to the driver vehicle whereon suitable power supplies, control mechanisms including associated electronic equipment, and recording and indicating devices are located.

Prior to making a measurement, the driver vehicle is disengaged from trailer 10, and placed at a distance of 100 to 150 feet from the trailer. At this distance neutron generator 60 may be safely used without shielding. To start the operating sequence, pole 24 is rotated in socket 22 to move the elongated extension of boom 28 about 120 degrees from its fully rearward position shown in FIG. 5, and thus carry detector 64 to a location where it is about 20 feet from the target of generator 60, and shield block 72 is situated between the detector and the generator target so as to preclude activation of he detector's sodium iodide crystal and housing material when generator 60 is operative. Solenoid plunger 54 is released to enter the opening in extension 52 whereby the boom is held against the tension of assembly 50 to maintain detector 64 positioned away from any significant neutron flux. The height of generator 60 is adjusted to the desired position, for example from 0 to 65 cm. above ground G, by turning the crank of reel device 42. An operator at the remote vehicle switches generator 60 to "on" by way of connections in box 70, and the ground below the generator is irradiated until a timer control in the remote vehicle operates to turn generator 60 to "off" about 100 seconds afterwards. Relay controls in box 70 immediately thereafter respond to the generator stoppage and automatically cause the energization of solenoid 56. Boom 28 is thereby released to the action of the spring of assembly 50, and swings detector 64 around to the rear of trailer 10. About six seconds after it is released, boom 28 contacts stop 46, and as shown in FIG. 5, locates detector 64 directly over the irradiated ground. Detector 64 thus becomes operatively responsive to count the gamma radiation emitted from the ground. The signal pulses thus produced are transmitted from the detector to the remote vehicle and the electronic equipment thereat which identifies in situ the ore materials of the ground.

In prospecting for silver the pulses can be fed into a 100 channel analyzer using a digital scale expansion so that the 0.66 mev. photopeak of $Ag^{110}$ covers about 15 channels, i.e., an energy range from approximately 0.55 mev. to 0.77 mev. At the same time, in order to make a half-life determination, the total information from the fifteen channels covering the 0.66-mev. photopeak is fed into a digital ratemeter every second while the spectrum is being accumulated. The output of the digital ratemeter is continuously read out onto a strip chart recorder. In addition, the spectrum is fed into a digital print-out circuit at the end of a 2-minute count, and at the same time it is plotted by an $x$–$y$ recorder. Any interference from other emitters recorded in the same energy range can be eliminated to a great extent by subtracting the base line in the usual manner.

Instrumentation in another form as shown in FIG. 6, includes an accelerator 80 providing 3 mev. neutrons, a scintillation detector 82, and a moderator shield 84, arranged in an operative association on a tailgate assembly 86 of a vehicle. Accelerator 80 and detector 82 are rigidly connected on a frame-like trolley structure 88, having wheels 89 adapted to roll on tracks 90 and 92, fixed to tailgate assembly 86 by Z-bars 94 and 95. A pair of tension springs 96 and 97 are fixed to one end of the frame of trolley 88 and to bar 94. A bumper pad 98 is also fixed to bar 94 to face the oncoming end of the trolley frame. An extension 99 from the other end of trolley 88 is provided with an opening which is adapted to receive a plunger of a solenoid 101. A slot 104 in the middle of tailgate assembly 86 is of such size as to underlie the target of accelerator 80 when trolley frame 88 is held against the tension of springs 96 and 97 by the latching action of the solenoid plunger 101 in the opening in extension 99, and to underlie detector 82 when trolley 88 is released for displacement by springs 96 and 97 and rolls back against pad 98. A cam stop 106 fixed to the tailgate assembly 86 coacts to lock with a cam face on extension 99 to prevent any rebound of the trolley upon its contact with pad 98. Moderator shield 84 is fixed to trolley 88 and rolls with the neutron generator 80 and detector 82 to alternately place the accelerator and detector over the area to be explored. As explained in connection with FIG. 5, the solenoid 101 can be energized immediately after irradiation so that the accelerator is automatically removed and the counter detector placed over the irradiated area. Just prior to irradiation tailgate 86 is lowered down to the ground. The irradiation, detection and recording follows, and the tailgate is raised in preparation for moving to another site. The whole operation requires about five minutes.

From the theoretical and experimental results of the application of neutron activation to silver exploration, it is clear that the sensitivity is high enough to use as a practical exploration tool under almost any environment. Undersea as well as extraterrestial mineral prospecting is made possible by applying thereto the method disclosed herein using known equipment suitably adapted for the purpose.

What is claimed is:

1. Apparatus for mineral ore exploration by neutron activation analysis comprising a base supporting for relative adjustments thereto a neutron generator source and a gamma ray detector, a radiation shield effectively positioned between said source and said detector, an electrically operated latch means normally maintaining said detector in an ineffective positional adjustment against a spring tension when said source is positioned by an adjustment thereof to attain an effective condition whereby said source irradiates a zone of substances, means operative to release said detector to said spring tension such that said detector is adjusted thereby to a position in which it is effective to measure radiation from said irradiated zone when said source is maintained in an ineffective condition.

2. The apparatus of claim 1 wherein said base comprises a bed surface and a trolley arrangement thereon, including tracks fastened to said bed and a frame support on wheels having limited alternating displacements on said tracks, said source and detector being secured adjacent to opposite ends of said frame, and said trolley supporting said shield within said frame and between said source and detector, an opening in a central portion of said bed, said spring tension being provided by expanded springs connected between one end of said trolley frame support and means fastening said tracks, said latch means being secured to said bed and coacting with hook means on an extension of another end of said trolley frame, so that said trolley is maintained against the tension of said expanded springs, whereby upon release of said latch means said trolley is drawn toward said track fastener and moves said source away from said opening in said bed and positions said detector over said opening.

3. Apparatus for mineral ore exploration by neutron activation analysis, comprising a horizontal base supporting an enclosure centrally situated thereon, a vertical support means rotatably mounted at one end of said base, a boom attached near the upper end of said vertical support, said boom having an elongated portion which in a first position extends across said enclosure and down under said base, a neutron generating source adjustably supported on said base at an opposite end thereof, said source directing an irradiating target thereof away from said base, a gamma radiation detector having a radiation shield contiguous thereto secured to the farthest end of said elongated boom so that said shield is maintained adjacent said source between the latter and said detector when said boom is in said first position, a spring drive means connected between said vertical support and said enclosure, a solenoid fixed to said base adjacent said vertical support, a projection extending from said vertical support in a plane with a plunger of said solenoid, said plunger coacting with said projection to maintain said boom in a second position against a tension of said spring drive means such that said detector is located a substantial distance from said source, control means including a timer and a gamma ray analyzer remotely located from said base, said remote control means having electrical connections to said solenoid, source and detector, and being operative to activate said source so as to irradiate a zone of substances adjacent thereto when said boom is maintained in said second position, and after a predetermined time measured by said timer to deactivate said source and energize said solenoid to release said vertical support under a driving tension to rotate said boom to said first position thereof to place said detector over said irradiated zone whereby said remote analyzer receives signals from said detector and provides data to identify mineral ores in said zone.

References Cited

UNITED STATES PATENTS

| | | | |
|---|---|---|---|
| 3,141,976 | 7/1964 | Macintyre | 250—105 |
| 3,372,281 | 3/1968 | Auld et al. | 250—106 |

RALPH G. NILSON, Primary Examiner

SAUL ELBAUM, Assistant Examiner

U.S. Cl. X.R.

250—108, 106